(12) United States Patent
Beamish et al.

(10) Patent No.: US 8,310,362 B2
(45) Date of Patent: Nov. 13, 2012

(54) METHOD AND APPARATUS TO RECEIVE LOCATION INFORMATION IN A DIVERSITY ENABLED RECEIVER

(75) Inventors: Norman Beamish, Cork (IE); Wayne Edwards, Cedar Rapids, IA (US); Aidan Murphy, Cork (IE); Hugh O Brien, Cork (IE); Conor O'Keeffe, Cork (IE); Patrick Pratt, Mallow (IE); David Redmond, Cork (IE); Daniel B Schwartz, Scottsdale, AZ (US); Keith Tilley, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 527 days.

(21) Appl. No.: 12/532,753

(22) PCT Filed: Mar. 26, 2007

(86) PCT No.: PCT/IB2007/051050
§ 371 (c)(1),
(2), (4) Date: Sep. 23, 2009

(87) PCT Pub. No.: WO2008/117127
PCT Pub. Date: Oct. 2, 2008

(65) Prior Publication Data
US 2010/0117824 A1 May 13, 2010

(51) Int. Cl.
*G08B 1/08* (2006.01)
(52) U.S. Cl. ............... 340/539.13; 340/870.11; 455/442
(58) Field of Classification Search ............ 340/539.13, 340/870.11, 870.01; 455/442, 277.1, 466, 455/132, 422.1, 276.1, 133, 500, 517, 524
See application file for complete search history.

(56) References Cited

U.S. PATENT DOCUMENTS

| | | | |
|---|---|---|---|
| 5,983,105 A * | 11/1999 | Ståhle | 455/442 |
| 6,188,879 B1 * | 2/2001 | Imamura | 455/277.1 |
| 6,469,680 B1 * | 10/2002 | Kelliher | 343/893 |
| 6,574,461 B1 * | 6/2003 | Skold | 455/277.2 |
| 7,010,270 B1 | 3/2006 | Thomas et al. | |
| 2003/0017833 A1 * | 1/2003 | Forrester | 455/456 |
| 2005/0064903 A1 | 3/2005 | Uotsu et al. | |
| 2006/0264193 A1 | 11/2006 | Wallace | |
| 2011/0125407 A1 * | 5/2011 | Pavel et al. | 702/14 |

FOREIGN PATENT DOCUMENTS

| | | |
|---|---|---|
| EP | 1213844 A1 | 12/2002 |
| WO | 03071713 A1 | 8/2003 |

OTHER PUBLICATIONS

International Search Report and Written Opinion correlating to PCT/IB2007/051050 dated Dec. 20, 2007.

\* cited by examiner

*Primary Examiner* — Daniel Previl

(57) ABSTRACT

A method of processing location information on a mobile device which includes a primary receiver for receiving a primary signal; a diversity receiver for receiving a diversity signal or location information; a diversity combiner which can combine primary and diversity signals to form a combined signal; and a first processing unit for processing the combined signal; the method comprising the steps of: identifying whether the device is in a location mode or a diversity mode; if the device is in location mode, disabling the diversity combiner; passing the output from the primary receiver directly to the first processing unit; and passing location information from the diversity receiver to a location processing unit.

12 Claims, 4 Drawing Sheets

METHOD AND APPARATUS TO RECEIVE LOCATION INFORMATION IN A DIVERSITY ENABLED RECEIVER

FIELD OF THE INVENTION

This invention relates to a method and apparatus to receive location information in a diversity enabled receiver, particularly but not exclusively, for cellular receivers such as mobile telephones.

BACKGROUND OF THE INVENTION

Modern cellular receivers are increasingly being required to have location determination capabilities. Recent regulations in the United States (E-911) require that cell phones are able to provide emergency services with handset location information. In addition, if the location of the handset is known it may be able to be used for location-based marketing and provision of other services based on location indication. In order to provide communication of location information for example GPS an additional RF signal path would be required within the device. This would increase the amount of circuitry and complexity and add additional costs to introduce the features required.

EP 1213844 A1 discloses a multimode receiver and a technique to reconfigure between different operating modes. This application does not deal with the subject of introducing location determination into the receiver.

U.S. Pat. No. 7,010,270 (Ericsson) teaches a way of operating parallel devices in the receiver. This patent does not address the issue of introducing location determination into the receiver, while continuing with the original tasks required by the receiver.

One object of the present invention is to provide a method and apparatus that overcomes at least some of the problems associated with the prior art and allows location information, such as GPS, to be integrated into a receiver without increasing the number of RF signal path required.

SUMMARY OF THE INVENTION

The present invention provides a method and an apparatus as described in the accompanying claims.

BRIEF DESCRIPTION OF THE DRAWINGS

Reference will now be made, by way of example to the accompanying drawings, in which.

DETAILED DESCRIPTION OF THE PREFERRED EMBODIMENTS

A mobile telephone (also referred to herein as a cell phone) or any other cellular or mobile receiver generally has the ability to receive signals from the base station in a diversity mode. This is particularly the case with 3G mobile phones. The diversity mode allows the mobile phone receiver to observe the signal sent by the base station at two or more spatially distinct locations. This provides the mobile phone receiver with a spatial diversity which gives it an enhanced ability to correctly receive the information transmitted by the base station. Diversity improves performance of the receiver, but in good signal conditions diversity does not add greatly to the quality of the information received. To provide the diversity a diversity receiver is required with a full separate RF signal path. The diversity receiver is often used unnecessarily where the signal quality is good.

The present invention seeks to make better use of this diversity receiver and at the same time provides a means by which location information capability can be achieved within the device.

Figure 1:
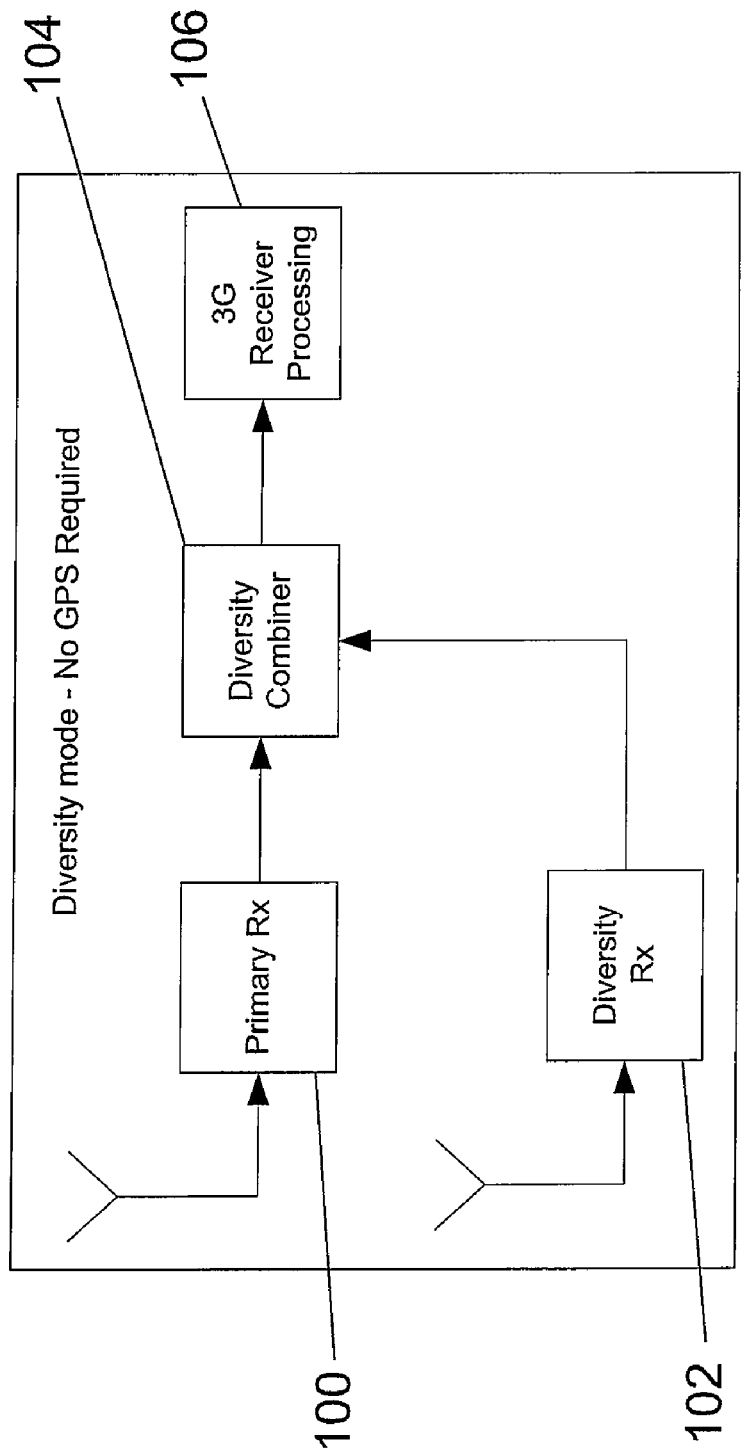
FIG. 1 is a block diagram of a primary and diversity receiver when no location information is required in accordance with one embodiment of the invention, given by way of example.

FIG. 1 shows the block diagram of a typical diversity mode implementation for a mobile telephone. A primary receiver 100 and a diversity receiver 102 are capable of receiving a primary and diversity signal respectively from one or more base stations (not shown). The output of the primary receiver and the diversity receiver are passed to a diversity combiner 104 where the two inputs are combined in order to deal with any poor quality on one or other of the inputs. The enhanced or combined signal is then passed to a 3G receiver processing unit 106.

Figure 2:
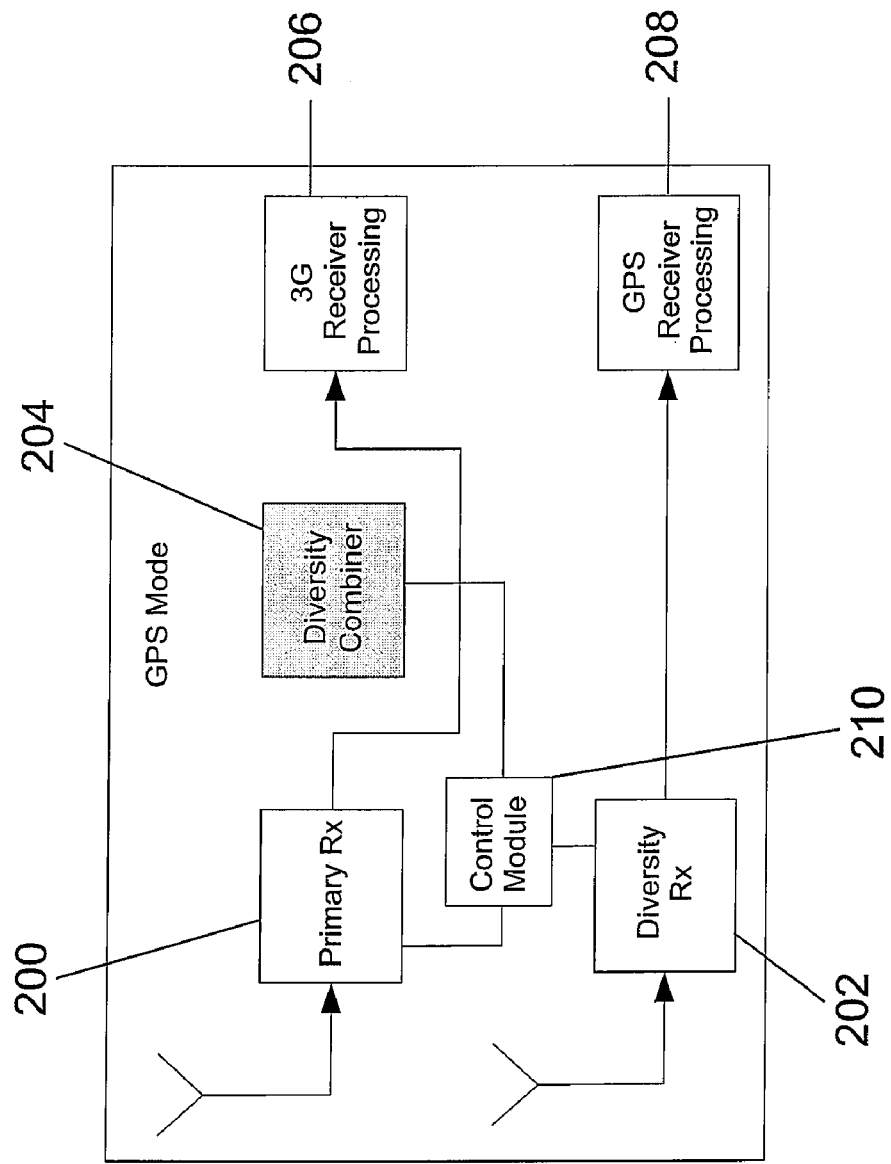
FIG. 2 is a block diagram of a primary and diversity receiver when location information is required in accordance with one embodiment of the invention, given by way of example.

FIG. 2 shows a block diagram of an adapted diversity mode implementation which is capable of processing GPS signals. The implementation includes a primary receiver 200 and a diversity receiver 202 as mentioned in FIG. 1. The diversity combiner 204 is not used in the mode where location information such as the GPS signal is to be processed. Instead the primary receiver passes data directly to the 3G receiver processing unit 206. The diversity receiver receives a GPS signal and this is passed directly to a GPS receiver processing unit 208. A control module 210 is used to control whether the output from the diversity receiver passes into the diversity combiner as shown in FIG. 1 or to the GPS receiver processing units as shown in FIG. 2. The control module monitors the signals received at the primary receiver, the diversity receiver and controls switching means (not shown) to direct the output from the diversity receiver to the appropriate destination.

The functioning of the control module will now be described in greater detail. The requirements to process GPS information may be dependent on specific events or on a time based sequence. In either case, the control module is triggered to instruct the diversity receiver to receive and process GPS location information instead of the normal diversity receiver information. When RF conditions are particularly good in respect of receiving 3G signals, the amount of times GPS information is processed may be increased. In particular the control module may detect the quality of information on the primary receiver and determine that the diversity mode is not required and that GPS information can be received. At certain times there may be a detrimental impact to the signal quality of the 3G signal. This will occur when GPS information has to be received and the RF signal quality is not particularly good. This is unlikely to happen very often and is a small penalty. The control module, by monitoring WCDMA and 3G conditions will be able to optimise the times for dealing with GPS information. The digital baseband (DBB) or controller intelligence will monitor the quality of the received signal (i.e. SNR-signal to noise ratio, signal level, interferer level etc.) and will use this information to choose the best time for switching to GPS mode)

Figure 3:
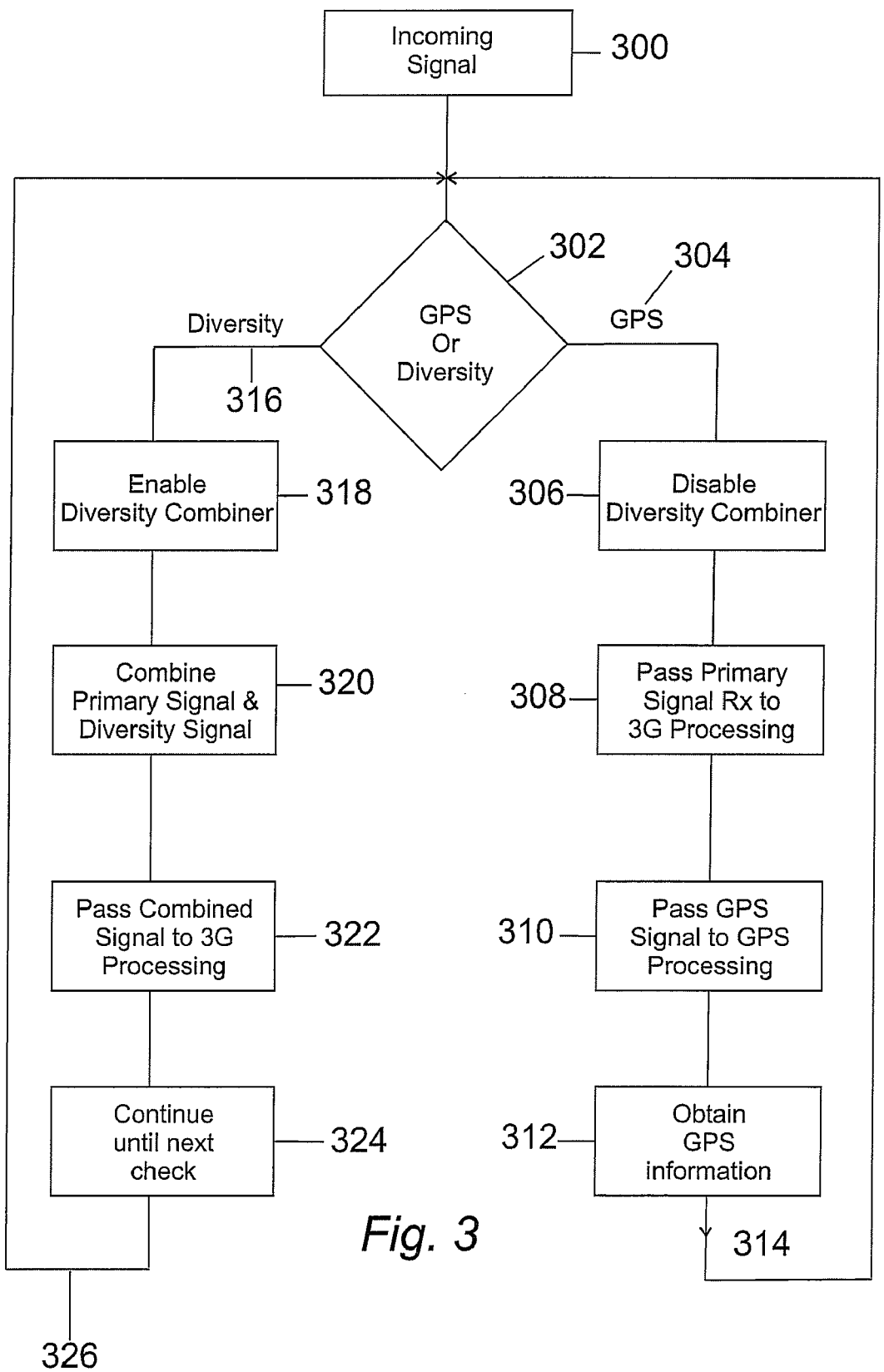
FIG. 3 is a flow chart of the steps of the method in accordance with one embodiment of the invention, given by way of example.

Referring now to FIG. 3, a flow chart of the method steps of the present invention is presented. An incoming signal is received (step 300) and processed by the control module to determine whether the quality of the received signal is high enough such that the diversity receiver could be switched to operate in GPS rather than diversity mode (step 302). The point at which this check is made could be on a temporal basis, based on signal quality, or any other appropriate means of determining when the check should be made. Typically the receiver will operate by default in diversity mode and will switch to GPS mode either at specific preset intervals or when the rx signal is high quality. There are two possibilities for effecting the switching. One is planned switching i.e. GPS information must be received at a specific time X. A second option is referred as opportunistic switching. In this situation the rx signal conditions are observed and when a strong, clear signal is being received the diversity path may be switched off and retasked for GPS reception. This second option might also offer the possibility to remove the need for an upcoming planned GPS event e.g. at time X GPS is scheduled to be received and then at time X-50 ms a very good normal signal is detected then it is possible to switch to the diversity path to receive GPS earlier than scheduled. This means it is no longer necessary to receive GPS at time X.

If the determination is made that the receiver is operating in GPS mode (step 304) the diversity combiner is disabled (step 306). When the diversity combiner is disabled the primary signal received by the primary receiver will be passed directly to the 3G receiver processing unit (step 308) and the GPS signal will be passed to the GPS processing units (step 310). This setup will continue until the GPS information has been received (step 312) at which point the process returns to step 302 (step 314). Typically the receiver does not stay in GPS mode continuously, only as long as is needed to receive the required location information and then return to diversity mode.

On the other hand if the determination at step 302 is that the receiver is operating in diversity mode (step 316) the diversity combiner is enabled (step 318). At this point the primary signal received by the primary receiver and the diversity signal will be combined in the diversity combiner (step 320). The combined signal will then be sent to the 3G processing unit (step 322). This setup will continue until the next check (step 324) at which point the process returns to step 302 (step 326).

Figure 4:
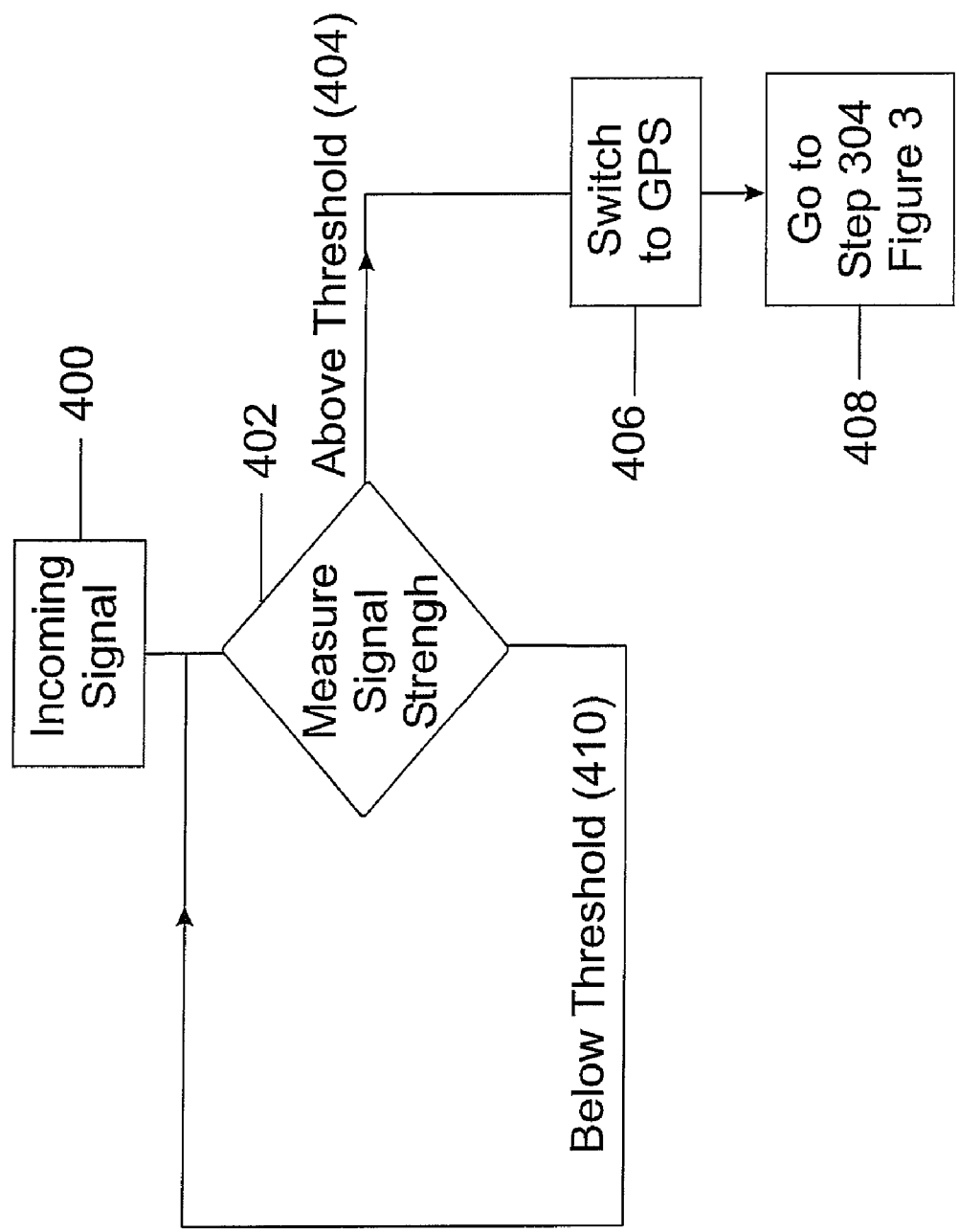
FIG. 4 is a flow chart showing the digital baseband decision making process in accordance with one embodiment of the invention given by way of example.

In the situation where the switching from diversity to GPS is effected in accordance with signal strength determination, the method may be implemented as shown in FIG. 4. An incoming signal is received 400 and a measure of signal strength is made 402. If the signal strength is above a predetermined threshold 404 the receiver is switched to GPS mode (step 406) and the process continues for step 304 of FIG. 3 (step 408). If the signal strength is below the predetermined threshold the process returns to step 402. It should be noted that this process does not effect the switching on a temporal basis, as described above.

The embodiments of the invention shown in the drawings have a number of advantages: for example, by using the diversity receiver signal path to receive the GPS signals no additional signal path is required to comply with the requirements for location information. The re use of the diversity receiver means that the controlling logic within the receiver can optimally share the diversity receiver signal path between the GPS and diversity receive functions by only switching to GPS at times when the diversity receiver does not improve overall receiver performance. The basic idea is that a diversity receiver adds a second chance for the receiver to detect the incoming signal, if the second chance is not needed e.g. signal is very clear giving up the diversity receiver does not have much consequence to the operation of the receiver.

The invention has been described in relation to a mobile telephone, although it will be appreciated that the invention may be applicable to many other mobile devices. For example, MP3 players, radios, televisions, PDAs, mobile computers or any other type of device where location information needs to be added. The particular embodiments described herein by way of example and variations may be included within the scope of the invention. The invention is particularly relevant to 3G mobile phones but may be applied to any other mobile phone standard.

The invention claimed is:

1. A method of processing location information on a mobile device which includes a primary receiver for receiving a primary signal; a diversity receiver for receiving a diversity signal or location information; a diversity combiner which can combine primary and diversity signals to form a combined signal; and a first processing unit for processing the combined signal; the method comprising the steps of:
   identifying whether the device is in a location mode or a diversity mode in a predetermined sequence;
   if the device is in location mode, disabling the diversity combiner;
   passing the output from the primary receiver directly to the first processing unit without passing the output through the diversity combiner; and passing location information from the diversity receiver to a location processing unit.

2. The method according to claim 1, further comprising measuring the quality of the primary signal to determine the predetermined sequence.

3. The method according to claim 2, further comprising re-enabling the diversity combiner if the device is identified as being in diversity mode.

4. The method according to claim 1, further comprising determining the predetermined sequence on a temporal basis.

5. The method according to claim 4, further comprising re-enabling the diversity combiner if the device is identified as being in diversity mode.

6. The method according to claim 1, further comprising re-enabling the diversity combiner if the device is identified as being in diversity mode.

7. A module for processing location information on a mobile device which includes a primary receiver for receiving a primary signal; a diversity receiver for receiving a diversity signal or location information; a diversity combiner which can combine primary and diversity signals to form a combined signal; and a first processing unit for processing the combined signal; the module comprising:
   identification means for determining whether the device is in a location mode or a diversity mode wherein the identification means operates in a predetermined sequence;
   a switch for switching the output from the primary receiver directly to the first processing unit and for switching location information from the diversity receiver to a location processing unit when the device is in location without passing the output through the diversity combiner.

8. The module according to claim 7, when the predetermined sequence is based on the quality of the primary signal.

9. The module according to claim 8, when the predetermined sequence is based on time.

10. The module according to claim 9, wherein the switch reconnects the primary receiver and the diversity receiver to the diversity combiner when the device is in diversity mode.

11. The module according to claim 8, wherein the switch reconnects the primary receiver and the diversity receiver to the diversity combiner when the device is in diversity mode.

12. The module according to claim 7, wherein the switch reconnects the primary receiver and the diversity receiver to the diversity combiner when the device is in diversity mode.

* * * * *